US006180255B1

(12) United States Patent
Valentini et al.

(10) Patent No.: US 6,180,255 B1
(45) **Date of Patent: *Jan. 30, 2001**

(54) STRUCTURED MEDIA FOR PHASE CHANGE INK PRINTING

(75) Inventors: Jose Esteban Valentini; Richard Roy Jones, both of Hendersonville, NC (US)

(73) Assignee: Agfa Gevaert N.V., Mortsel (BE)

( * ) Notice: Under 35 U.S.C. 154(b), the term of this patent shall be extended for 0 days.

This patent is subject to a terminal disclaimer.

(21) Appl. No.: 09/019,106

(22) Filed: Feb. 5, 1998

(51) Int. Cl.[7] ...................................................... B32B 27/00
(52) U.S. Cl. .......................... 428/500; 428/195; 428/323; 428/341; 428/522
(58) Field of Search .................................... 428/195, 206, 428/212, 219, 500, 341, 323, 522

(56) References Cited

U.S. PATENT DOCUMENTS

| | | | | |
|---|---|---|---|---|
| 3,889,270 | | 6/1975 | Hoffman et al. . | |
| 4,460,637 | | 7/1984 | Miyanato et al. . | |
| 4,542,059 | | 9/1985 | Toyanoh et al. . | |
| 4,592,951 | | 6/1986 | Viola . | |
| 4,636,410 | | 1/1987 | Akiya et al. . | |
| 4,770,934 | | 9/1988 | Yamasaki et al. . | |
| 4,857,386 | * | 8/1989 | Butters et al. | 428/206 |
| 5,202,205 | | 4/1993 | Malhofa . | |
| 5,276,468 | | 1/1994 | Deur et al. . | |
| 5,302,436 | | 4/1994 | Miller . | |
| 5,418,078 | | 5/1995 | Desie et al. . | |
| 5,753,360 | * | 5/1998 | Jones et al. | 428/323 |
| 5,910,359 | * | 6/1999 | Kobayashi et al. | 428/327 |

FOREIGN PATENT DOCUMENTS

| | | |
|---|---|---|
| 0435675 A2 | 7/1991 | (EP) . |
| 0487349 A1 | 5/1992 | (EP) . |
| 0582466 A1 | 2/1994 | (EP) . |
| 0634287 A1 | 1/1997 | (EP) . |
| 0818321 A1 | 1/1998 | (EP) . |
| 2147003 | 5/1985 | (GB) . |
| 632046 | 2/1974 | (JP) . |
| 62-160287 | 7/1987 | (JP) . |
| 4364947 | 12/1992 | (JP) . |
| 551470 | 3/1993 | (JP) . |
| 693122 | 4/1994 | (JP) . |
| 781214 | 3/1995 | (JP) . |

* cited by examiner

*Primary Examiner*—Bruce H. Hess
*Assistant Examiner*—Michael E Grendzynsk
(74) *Attorney, Agent, or Firm*—Joseph T. Guy, Jr.; Robert A. Sabourin

(57) ABSTRACT

A recording media for phase change ink recording comprising: a support; 30–200 mg/dm$^2$ of a receptive layer coated on the support wherein the receptive layer comprises: a binder comprising: a water soluble polymer; and a water insoluble polymer; wherein the combined weight of the water soluble polymer and the water insoluble polymer comprises at least 50%, by weight, and no more than 95%, by weight, water insoluble binder; and an optional inorganic particulate material. The media has an island size of no more than 15 $\mu$m and an asperity of 5.0 to 6.2 $\mu$m which is formed by controlling the drying rate.

13 Claims, No Drawings

STRUCTURED MEDIA FOR PHASE CHANGE INK PRINTING

FIELD OF INVENTION

The present invention is directed to an improved media for use with ink jet printers. More specifically, the present invention is directed to an improved media which is superior as a receptor for phase change ink printing.

BACKGROUND OF THE INVENTION

Transparent films displaying information are widely used throughout many different industries and for many applications. Typically, a positive image is formed by placing an ink or pigment onto a transparent plastic sheet. The image is then displayed by projection of transmitted light.

Phase change ink printing has been demonstrated to be a superior method of printing. Among the advantages offered by phase change ink printing is the ability to obtain a high optical density and large print areas without the necessity for removing large volumes of solvent after printing. The impact of phase change ink printing for transparencies has been impeded due to the lack of a suitable media. Transparent media designed for use with aqueous ink jet printers are often used but these exhibit insufficient adhesion between the phase change ink and the media.

Phase change inks are characterized by their ability to remain in a solid state at ambient to warm conditions yet melt to a liquid at the printing head operating temperatures. Exemplary printing apparatus are disclosed, for example, in U.S. Pat. No. 5,276,468. The physical thermomechanical properties of the solid glassy state, the solid rubbery plateau state and the liquid melt are all important in the design of the phase change inks and printers. Exemplary phase change inks are provided, for example, in U.S. Pat. No. 5,372,852.

Contrary to solvent ink systems the phase change ink resides predominantly on the surface of the media and does not appreciably diffuse into the matrix of the media or coating. This phenomenon has challenged skilled artisans to develop a media which has suitable adhesion with the phase change inks. Media presently known in the art generates too weak of an adhesive bond to withstand even moderate impact. The prints delaminate easily during normal use. This is particularly a problem when large areas are printed.

Three methods are known in the adhesive art which increase the strength of the adhesive bond. The first is to increase the polarity of the surface to create high surface energy. This increases adhesion to the ink by a thermodynamic driving force to lower the total interfacial energy. The second increases the dispersive forces between media and ink by coating a primer with properties intermediate between the base polymer sheet and the ink. Using the rule that "like dissolves like" better anchorage results. However, neither approach provides the high impact resistance needed to avoid delamination in the impacted area. The third approach commonly used to improve adhesion increases the surface area. However, this results in large increases in surface haze, making the media no longer transparent.

Printing phase change ink at high percent surface coverage can negate high surface haze by filling in a rough surface. Thus, it is possible to create clarity by overprinting clear phase change ink in low image density areas. Using this approach, the high surface area approach to increased phase change ink anchorage can be made to be essentially transparent after printing. But high surface area alone is not effective in increasing the impact resistance to acceptable levels, particularly if the porosity is not filled in by the ink, either by its being too narrow in radial dimension or too deep into the coating. What is required is a particular porosity with a large number of accessible pores with anchorage sites which provide lock points for the congealed phase change ink.

There is a need for a media which will take full advantage of the properties offered by phase change ink printing. Provided herein is a coated media which exhibits excellent adhesion to phase change ink, offers adequate clarity, and greatly improves durability of the printed image as measured by increased resistance to ink removal.

Ink removal can either be from scratching with a hard object, adhesive removal by contact of the ink with an adhesive-containing object such as an adhesive tape, or by impact and consequent delamination of the phase change ink from the media surface. The first type of failure is largely a function of rheology of the phase change ink and as such is not addressed in the present invention. However, to the extent that ink is imbedded into the media as described in the present invention, removal by gouging with a blunt or sharp, hard object can be improved. Ink removal by adhesive contact is affected by the adhesion to the ink surface which depends in turn on its surface energy and as such is not addressed in the present invention. However, to the extent that the result actually loads the ink/media interface, a porous surface with ink imbedded into these pores breaks up the continuous failure line resulting in improved retention of ink at peel-like frequencies.

U.S. Pat. No. 5,753,360, which is commonly assigned, defines a media which is suitable for ink jet printing media. The results are based on a tape test which is a relatively mild test for adhesion. A more strenuous test, based on physical impact, indicates that a far superior film can be obtained which is described herein.

SUMMARY OF THE INVENTION

It is an object of the present invention to provide an improved recording media. A particular object is to provide a media which is suitable for use with phase change ink printing.

A particular feature of the present invention is improved resistance to physical removal of the phase change ink from the media.

Another particular feature is increased adhesion between the phase change ink and the media.

These and other advantages are provided in a recording medium for phase change ink recording comprising: a support with more than 30 $mg/dm^2$ and not more than 200 $mg/dm^2$ of a receptive layer coated on the support. The receptive layer comprises a binder which comprises a water soluble polymer and a water insoluble polymer. The combined weight of the water soluble polymer and the water insoluble polymer comprise at least 50%, by weight, and no more than 95%, by weight, water insoluble polymer.

A particularly preferred media is provided in a recording medium for phase change ink recording comprising a polyethylene terephthalate support with 30–200 $mg/dm^2$ of a receptive layer coated on the support. The receptive layer comprises a binder which comprises polyvinyl alcohol and a second polymer which comprises 10–100%, by weight, styrene and 0–90%, by weight, acrylate. The combined weight of the polyvinyl alcohol and the second polymer comprise at least 50%, by weight, second polymer.

A preferred process for obtaining the media is detailed in a process for forming a medium for phase change ink recording comprising the steps of:

a) Transporting a support through a coating station.

b) Applying a suspension to the support as the support transits through the coating station. The suspension comprises: water; a water soluble polymer; and a water insoluble polymer and the combined weight of the water soluble polymer and said water insoluble polymer is at least 50%, by weight, and no more than 95%, by weight, water insoluble polymer.

c) Removing the water from the suspension by evaporation to form a media herein the water soluble polymer and the water insoluble polymer have a combined coating weight on the media of at least 30 $mg/dm^2$ and not more than 200 $mg/dm^2$.

DETAILED DESCRIPTION OF THE INVENTION

The inventive media comprises a support with a receptive layer coated thereon.

The receptive layer comprises a binder with an optional inorganic particulate material dispersed therein. The binder comprises a water soluble polymer and a water insoluble polymer.

The term "water soluble polymer" refers specifically to a polymer which dissolves in water completely as characterized by the hydrodynamic particle diameter in water as measured by light scattering. For purposes of the present invention, a polymer with a light scattering hydrodynamic particle diameter, in water, of no more than 0.05 $\mu$m indicates molecular scale dissolution. A polymer with a light scattering hydrodynamic particle diameter, in water, of no more than 0.05 $\mu$m is referred to herein as a water soluble polymer. The water soluble polymer preferably comprises at least one compound chosen from a group consisting of polyvinyl alcohol, polyacrylamide, methyl cellulose, polyvinyl pyrrolidone and gelatin. The water soluble polymer more preferably comprises at least one element chosen from a group consisting of polyvinyl alcohol, polyacrylamide, polyvinyl pyrrolidone and gelatin. The most preferred water soluble polymer is polyvinylalcohol with a degree of hydrolysis between 70 and 100%.

The term "water insoluble polymer" refers specifically to polymers which are described as consisting of a dispersion or emulsion of polymer in water and are characterized by the hydrodynamic particle diameter, in water, as determined by light scattering. A light scattering hydrodynamic particle diameter, in water, of greater than 0.05 $\mu$m implies a dispersion of discrete particles containing one or more large molecule requiring stabilization by surfactants or other means to remain suspended. The water insoluble polymer preferably comprises at least one polymerizable monomer chosen from acrylic ester, olefin, aromatic substituted olefin, vinyl, aromatic substituted vinyl, urethane and unsaturated amide. The water insoluble polymers may comprise polar functionality with the proviso that the degree of functionality is below a level sufficient to form a water soluble polymer as characterized by having a hydrodynamic particle size of less than 0.05 $\mu$m. A particularly preferred water insoluble polymer is styrene. More preferred is a polymer comprising 10–100%, by weight, styrene and 0–90%, by weight, acrylic ester. More preferred is a copolymer comprising 50–99%, by weight, styrene and 1–50%, by weight, acrylic ester. Most preferred is a copolymer comprising a styrene core and a shell comprising an acrylic acid, examples of which are described in U.S. Pat. Nos. 5,194,263; 5,214,096 and 5,460,827.

The ratio of water soluble polymer to water insoluble polymer is chosen to maximize the adhesion, as determined by impact resistance, and to take advantage of the ability of the phase change ink to adhere to the media while still maintaining adequate scratch protection. It is preferred that the combined weight of water soluble binder and water insoluble binder comprise at least 50%, by weight, water insoluble polymer. Below 50% water insoluble polymer adhesion unexpectedly deteriorates. It is more preferable that the combined weight of the water soluble and water insoluble polymer comprise at least 70%, by weight, water insoluble polymer and most preferably at least 80% by weight water insoluble polymer. It is preferred that the combined weight of the water soluble polymer and water insoluble polymer comprise no more than 95%, by weight, water insoluble polymer due to a decrease in adhesion between the media and the phase change ink.

A preferred media comprises a receptive layer comprising polyvinyl alcohol as the water soluble polymer and a polymer comprising styrene as the water insoluble polymer. More preferably, the water insoluble polymer is a polymer comprising 10–100% styrene and 0–90% acrylic ester. In the preferred media the polymer comprising styrene represents 50% to 95%, by weight, of the total weight of the polyvinyl alcohol and polymer comprising styrene. In a particularly preferred media the polymer comprising styrene represents 80% to 90%, by weight, of the total weight of the polyvinyl alcohol and polymer comprising styrene.

A particularly preferred media comprises a receptive layer comprising polyvinylalcohol as the water soluble polymer and a copolymer comprising a styrene core with a shell comprising acrylic ester.

The inorganic particulate material is preferably chosen from a group consisting of colloidal silica and alumina. The preferred inorganic particulate material is silica with a hydrodynamic diameter in water of no more than 0.3 $\mu$m. More preferably the inorganic particulate material has a hydrodynamic diameter in water of no more than 0.1 $\mu$m. Also preferred as a particulate material is silica with a hydrodynamic diameter in water of no more than about 0.05 $\mu$m. The silica is preferably at least 0.005 $\mu$m. A hydrodynamic diameter in water between 0.005 $\mu$m and 0.030 $\mu$m with a specific surface area between 100 and 300 $m^2/g$ is particularly advantageous for superior adhesion. More preferred for adhesion is a silica hydrodynamic diameter in water of 0.010 to 0.020 $\mu$m with a surface area of 200 to 300 $m^2/g$. Scratch resistance is most improved with a silica hydrodynamic diameter in water of 0.01 to 0.015 $\mu$m and a specific surface area of 200 to 250 $m^2/g$.

A preferred colloidal silica for use in this invention is a multispherically coupled and/or branched colloidal silica. Specific examples are colloidal silica particles having a long chain structure in which spherical colloidal silica is coupled in a multispherical form. Also preferred is a colloidal silica in which the coupled silica is branched. Multispherically coupled colloidal silica is obtained by forming particle-particle bonds between primary particles of spherical silica by interspersing metal ions having a valence of two or more between the spherical silica particles. Preferably, the multispherically coupled colloidal silica has at least three particles coupled together. More preferably the multispherically coupled colloidal silica has at least five particles coupled together and most preferably the multispherically coupled colloidal silica has at least seven particles coupled together. The hydrodynamic diameter in water of the inorganic particulate material is determined as the diameter of a spherical particle with the same hydrodynamic properties as the sample in question. By way of example, a fibrous silica particle with dimensions of approximately 0.150 $\mu$m by 0.014 μm exhibits a hydrodynamic diameter in water of approximately 0.035 μm.

The inorganic particulate matter of the receptive layer represents less than 50%, by weight, of the combined coating weight of the inorganic particulate matter, the water soluble polymer and the water insoluble polymer. In a preferred embodiment the inorganic particulate matter of the receptive layer represents less than 20%, by weight, of the combined coating weight of the inorganic particulate matter, the water soluble polymer and the water insoluble polymer. In a more preferred embodiment the inorganic particulate matter of the receptive layer represents less than 5%, by weight, of the combined coating weight of the inorganic particulate matter, the water soluble polymer and the water insoluble polymer.

It is most preferable to add a cross linker to the receptive layer to increase the strength of the dried coating. Aldehyde hardeners such as formaldehyde or glutaraldehyde are suitable hardeners for polyvinyl alcohol. Pyridinium based hardeners such as those described in, for example, U.S. Pat. Nos. 3,880,665, 4,418,142, 4,063,952 and 4,014,862 and imidazolium hardeners as defined in Fodor, et al, U.S. Pat. Nos. 5,459,029; 5,378,842; 5,591,863 and 5,601,971 are suitable for use in the present invention. Aziridenes and epoxides are also suitable hardeners.

Crosslinking is well known in the art to form intermolecular bonds between various molecules thereby forming a network. In the instant invention a crosslinker may be chosen to form intermolecular bonds between pairs of water soluble polymers, between pairs of water insoluble polymers, or between water soluble polymers and water insoluble polymers. If crosslinking is applied it is most preferable to crosslink the polymers to the inorganic particulate matter. It is preferable to apply any crosslinking additive just prior to or during coating. It is contemplated that the crosslinking may occur prior to formation of the coating solution or in situ.

The term "gelatin" as used herein refers to the protein substances which are derived from collagen. In the context of the present invention "gelatin" also refers to substantially equivalent substances such as synthetic analogues of gelatin. Generally gelatin is classified as alkaline gelatin, acidic gelatin or enzymatic gelatin. Alkaline gelatin is obtained from the treatment of collagen with a base such as calcium hydroxide, for example. Acidic gelatin is that which is obtained from the treatment of collagen in acid such as, for example, hydrochloric acid and enzymatic gelatin is generated with a hydrolase treatment of collagen. The teachings of the present invention are not restricted to gelatin type or the molecular weight of the gelatin with the proviso that after preparation of the gelatin a sufficient number of pendant carboxylic acid and amine groups remain for reactivity as taught herein. Carboxyl-containing and amine containing polymers, or copolymers, can be modified as taught herein so as to lessen water absorption without degrading the desirable properties associated with such polymers and copolymers.

Other materials can be added to the receptive layer to aid in coating and to alter the rheological properties of either the coating solution or the dried layer. Polymethylmethacrylate beads can be added to assist with transport through phase change ink printers. Care must be taken to insure that the amount of beads is maintained at a low enough level to insure that adhesion of the phase change ink to the substrate is not deteriorated. Preferably, the beads should represent no more than about 1.0% by weight of the receptive layer. It is conventional to add surfactants to a coating solution to improve the coating quality. Surfactants and conventional coating aids are compatible with the present invention.

The combined coating weight of the inorganic particulate matter, the water soluble polymer, and the water insoluble polymer is preferably more than 30 $mg/dm^2$ and no more than 200 $mg/dm^2$. Above 200 $mg/dm^2$ the adhesion advantage diminishes and the increased cost of raw materials is not justified. It is more preferred that the combined coating weight of the inorganic particulate material, the water soluble polymer and the water insoluble polymer be at least 40 $mg/dm^2$. Most preferred is a combined coating weight of the inorganic particulate material, the water soluble polymer and the water insoluble polymer of at least 60 $mg/dm^2$ to insure adequate phase change ink adhesion and adequate resistance to scratching. A combined coating weight of the inorganic particulate material, the water soluble polymer and the water insoluble polymer of at least 50 $mg/dm^2$ and no more than 200 $mg/dm^2$ is a preferred range and most preferred is a combined coating weight of the inorganic particulate material, the water soluble polymer and the water insoluble polymer at least 40 $mg/dm^2$ and no more than 100 $mg/dm^2$.

The preferred support is a polyester obtained from the condensation polymerization of a diol and a dicarboxylic acid. Preferred dicarboxylic acids include terephthalate acid, isophthalic acid, phthalic acid, naphthalenedicarboxylic acid, adipic acid and sebacic acid. Preferred diols include ethylene glycol, trimethylene glycol, tetramethylene glycol and cyclohexanedimethanol. Specific polyesters suitable for use in the present invention are polyethylene terephthalate, polyethylene-p-hydroxybenzoate, poly-1,4-cyclohexylene dimethylene terephthalate, and polyethylene-2,6-naphthalenecarboxylate. Polyethylene terephthalate is the most preferred polyester for the support due to superior water resistance, excellent chemical resistance and durability. The polyester support is preferably 1–10 mil in thickness. More preferably the polyester support is 3–8 mil thick and most preferably the polyester support is either 3.5–4.5 mil or 6–8 mil thick. The receptive layer may also be applied to cellulose base media such as paper and the like.

A primer layer is preferably included between the receptive layer and the support to provide increased adhesion between the receptive layer and the support. Preferred primer layers are resin layers or antistatic layers. Resin and antistatic primer layers are described, for example, in U.S. Pat. Nos. 3,567,452; 4,916,011; 4,701,403; 4,891,308; and 4,225,665, and 5,554,447.

The primer layer is typically applied and dry-cured during the manufacture of the polyester support. When polyethylene terephthalate is manufactured for use as a photographic support, the polymer is cast as a film, the mixed polymer primer layer composition is applied to one or both sides and the structure is then biaxially stretched. The biaxial stretching is optionally followed by coating of either a gelatin subbing layer or an antistatic layer. Upon completion of the stretching and the application of the primer layer compositions, it is necessary to remove strain and tension in the support by a heat treatment comparable to the annealing of glass. Air temperatures of from 100° C. to 160° C. are typically used for this heat treatment.

It is preferable to activate the surface of the support prior to coating to improve the coating quality thereon. The activation can be accomplished by corona-discharge, glow-discharge, UV-rays or flame treatment. Corona-discharge is preferred and can be carried out to apply an energy of 1 mw to 1 $kW/m^2$. More preferred is an energy of 0.1 w to 5 $w/m^2$.

Bactericides may optionally be added to the receptive layer or the primer layer to prevent bacteria growth. Preferred are Kathon®, neomycin sulfate, and others as known in the art.

An optional, but preferred backing layer can be added opposite the receptive layer to decrease curl, impart color, assist in transport, and other properties as common to the art. The backing layer may comprise cross linkers to assist in the formation of a stronger matrix. Preferred cross linkers for the backing layer are carboxyl activating agents as defined in Weatherill, U.S. Pat. No. 5,391,477. Most preferred are imidazolium hardeners as defined in Fodor, et al, U.S. Pat. Nos. 5,459,029; 5,378,842; 5,591,863; and 5,601,971. Aziridine and epoxy crosslinkers are also suitable crosslinkers. The backing layer may also comprise transport beads such as polymethylmethacrylate. It is known in the art to add various surfactants to improve coating quality. Such teachings are relevant to the backing layer of the present invention.

Phase change inks are characterized, in part, by their propensity to remain in a solid phase at ambient temperature and in the liquid phase at elevated temperatures in the printing head. The ink is heated to the liquid phase and droplets of liquid ink are ejected from the printing head. When the ink droplets contact the surface of the printing media they quickly solidify to form a pattern of solid ink drops. This process is known as direct ink jet printing. Other devices deliver the liquid ink droplets to a heated drum, maintained just below the melting temperature of the phase change inks. The patterned ink is then transferred from the drum in the rubbery state to the media under pressure. This process is known as indirect printing.

The phase change ink composition comprises the combination of a phase change ink carrier and a compatible colorant. The thermomechanical properties of the carrier are adjusted according to the mode of printing and further to match the precise parameters of the printer design. Thus each printer design has a matching optimized ink.

Exemplary phase change ink colorants comprise a phase change ink soluble complex of (a) a tertiary alkyl primary amine and (b) dye chromophores having at least one pendant acid functional group in the free acid form. Each of the dye chromophores employed in producing the phase change ink colorants are characterized as follows: (1) the unmodified counterpart dye chromophores employed in the formation of the chemical modified dye chromophores have limited solubility in the phase change ink carrier compositions, (2) the chemically modified dye chromophores have at least one free acid group, and (3) the chemically modified dye chromophores form phase change ink soluble complexes with tertiary alkyl primary amines. For example, the modified phase change ink colorants can be produced from unmodified dye chromophores such as the class of Color Index dyes referred to as Acid and Direct dyes. These unmodified dye chromophores have limited solubility in the phase change ink carrier so that insufficient color is produced from inks made from these carriers. The modified dye chromophore preferably comprises a free acid derivative of an xanthene dye.

The tertiary alkyl primary amine typically includes alkyl groups having a total of 12 to 22 carbon atoms, and preferably from 12 to 14 carbon atoms. The tertiary alkyl primary amines of particular interest are produced by Rohm and Haas, Incorporated of Houston, Tex. under the trade names Primene JMT and Primene 81-R. Primene 81-R is the preferred material. The tertiary alkyl primary amine of this invention comprises a composition represented by the structural formula:

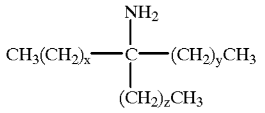

wherein:

x is an integer of from 0 to 18;

y is an integer of from 0 to 18; and z is an integer of from 0 to 18;

with the proviso that the integers x, y and z are chosen according to the relationship:

$x+y+z=8$ to 18.

Exemplary phase change ink carriers typically comprise a fatty amide containing material. The fatty amide-containing material of the phase change ink carrier composition preferably comprises a tetraamide compound. The preferred tetra-amide compounds for producing the phase change ink carrier composition are dimeric acid-based tetra-amides which preferably include the reaction product of a fatty acid, a diamine such as ethylene diamine and a dimer acid. Fatty acids having from 10 to 22 carbon atoms are preferably employed in the formation of the dimer acid-based tetra-amide. These dimer acid-based tetramides are produced by Union Camp and comprise the reaction product of ethylene diamine, dimer acid, and a fatty acid chosen from decanoic acid, myristic acid, stearic acid and docasanic acid. The preferred dimer acid-based tetraamide is the reaction product of dimer acid, ethylene diamine and stearic acid in a stoichiometric ratio of 1:2:2, respectively. Stearic acid is the preferred fatty acid reactant because its adduct with dimer acid and ethylene diamine has the lowest viscosity of the dimer acid-based tetra-amides.

The fatty amide-containing material can also comprise a mono-amide. In fact, in the preferred case, the phase change ink carrier composition comprises both a tetra-amide compound and a mono-amide compound. The mono-amide compound typically comprises either a primary or secondary mono-amide, but is preferably a secondary mono-amide. Of the primary mono-amides stearamide, such as Kemamide S, manufactured by Witco Chemical Company, can be employed. As for the secondary mono-amides behenyl behemamide and stearyl stearamide are extremely useful mono-amides.

Another way of describing the secondary mono-amide compound is by structural formula. More specifically a suitable secondary mono-amide compound is represented by the structural formula:

$$C_xH_y\text{—}CO\text{—}NHC_aH_b$$

wherein:

x is an integer from 5 to 21;

y is an integer from 11 to 43;

a is an integer from 6 to 22; and b is an integer from 13 to 45.

The preferred fatty amide-containing materials comprise a plurality of fatty amide materials which are physically compatible with each other. Typically, even when a plurality of fatty amide-containing compounds are employed to produce the phase change ink carrier composition, the carrier composition has a substantially single melting point transition. The melting point of the phase change ink carrier composition is preferably at least about 70° C., more preferably at least 80° C. and most preferably at least 85° C.

The preferred phase change ink carrier composition comprises a tetra-amide and a mono-amide. The weight ratio of the tetra-amide to the mono-amide in the preferred instance is from about 2:1 to 1:10 and more preferably from about 1:1 to 1:3.

Modifiers can be added to the carrier composition to increase the flexibility and adhesion. A preferred modifier is a tackifier. Suitable tackifiers are compatible with fatty amide-containing materials and include, for example, Foral 85, a glycerol ester of hydrogenated abietic acid, and Foral 105, a pentaerythritol ester of hydroabietic acid, both manufactured by Hercules Chemical Company; Nevtac 100 and Nevtac 80 synthetic polyterpene resins manufactured by Neville Chemical Company, Wingtack 86, a modified synthetic polyterpene resin manufactured by Goodyear Chemical Company, and Arakawa KE 311, a rosin ester manufactured by Arakawa Chemical Company.

Plasticizers are optionally, and preferably, added to the phase change ink carrier to increase flexibility and lower melt viscosity. Particularly suitable plasticizers include dioctyl phthalate, diundecyl phthalate, alkylbenzyl phthalate (Santicizer 278) and triphenyl phosphate, all manufactured by Monsanto Chemical Company; tributoxyethyl phosphate (KP-140) manufactured by FMC Corporation; dicyclohexyl phthalate (Morflex 150) manufactured by Morflex Chemical Company Inc.; and trioctyl trimellitate, manufactured by Kodak.

Other materials may be added to the phase change ink carrier composition. In a typical phase change ink chemical composition, antioxidants are added for preventing discoloration of the carrier composition. The preferred antioxidant materials include Irganox 1010 manufactured by Ciba Geigy; and Naugard 76, Naugard 512, and Naugard 524 manufactured by Uniroyal Chemical Company; the most preferred antioxidant being Naugard 524.

A particularly suitable phase change ink carrier composition comprises a tetra-amide and a mono-amide compound, a tackifier, a plasticizer, and a viscosity modifying agent. The preferred compositional ranges of this phase change ink carrier composition are as follows: from about 10 to 50 weight percent of a tetraamide compound, from about 30 to 80 weight percent of a mono-amide compound, from about 0 to 25 weight percent of a tackifier, from about 0 to 25 weight percent of a plasticizer, and from about 0 to 10 weight percent of a viscosity modifying agent.

Preferred phase change inks exhibit a high level of lightness, chroma, and rectilinear light transmissivity when utilized in a thin film of substantially uniform thickness, so that color images can be conveyed using overhead projection techniques. Another preferred property of the ink carrier is the ability to be reoriented into a thin film after printing without cracking or transferring to the rollers typically used for reorientation.

A phase change ink printed substrate is typically produced in a drop-on-demand ink jet printer. The phase change ink is applied to at least one surface of the substrate in the form of a predetermined pattern of solidified drops. Upon impacting the substrate surface, the ink drops, which are essentially spherical in flight, wet the substrate, undergo a liquid-to-solid phase change, and adhere to the substrate. Each drop on the substrate surface is non-uniform in thickness and transmits light in a non-rectilinear path.

The pattern of solidified phase change ink drops can, however, be reoriented to produce a light-transmissive phase change ink film on the substrate which has a high degree of lightness and chroma, when measured with a transmission spectrophotometer, and which transmits light in a substantially rectilinear path. The reorientation step involves the controlled formation of a phase change ink layer of a substantially uniform thickness. After reorientation, the layer of light-transmissive ink will transmit light in a substantially rectilinear path. If the substrate on which the ink is applied is also light transmissive, a projected image having clearly visible intense colors can be formed when a beam of light is projected through the reoriented printed substrate.

While not limited to any theory the mechanism proposed for the unexpected results shown herein is that flocculation induced by the water soluble polymer occurs with decreased force between coalesced particles. Due to the more open and less dense packing of the floc, an open structure is formed which is probably not as close packed as the structure which would form in the absence of flocculation. As evaporation continues the networks emerge from the structure of the floc. Upon further evaporation the surface of the floc network becomes exposed and capillary forces arise. The result of the capillary forces is that water surfaces of negative curvature occur in the interstices between particles. These forces arise partly because the solid/vapor interface has a higher energy than that of the solid/liquid interface. The liquid therefore tends to wet the solid. As the liquid covers the solid, a tensile stress appears on the liquid. Due to conservation this stress must be compensated by a compressive stress that shrinks the network forming islands and large pores.

The receptor layer is applied to the support as a coating suspension in a solvent. The most preferred solvent is water. The coating suspension comprises inorganic particulate material, a water soluble polymer and a water insoluble polymer. After application of the coating suspension onto the support the solvent is removed yielding a solid receptive layer comprising inorganic particulate matter, water soluble polymer and water insoluble polymer.

Once solutions are coated on the support, the aggregation process becomes prevalent as the coating dries. The liquid solution evolves into an irregular surface with a wide range of shapes and tortuous patterns depending upon both the drying rate and the initial concentration of the coating solutions. At very low drying rates a porous film appears to be uniform but with numerous cracks. At drying rates between 150 and 800 mg $H_2O$/min. sq. dm. the film evolves into a sequence of rounded small islands separated by pores. As the drying rate increases further, the islands become larger. Measurements of the island size have been measured by using scaled electronmicrographs. At drying rates between 150 and 800 mg $H_2O$/min sq. dm. the island size is optimized. Most preferred is a drying rate of between 200 and 500 mg $H_2O$/min sq. dm.

This preferred structure can best be described by using scaled electronmicrographs. The island size is determined as the diameter of a circle having the same projected surface area as the island. In this way, the optimum island size has been determined to have a size of no more than 15 $\mu$m diameter. More preferably, the island size is no more than 10 $\mu$m. It is most preferred that the island be at least 1 $\mu$m. The pores can be best described by taking cross sections in electronmicrographs and measuring both the asperity, or depth of the pore (Y), and the extent to which the pore wall is recessed from the inner edge of the pore opening (X). The angle defined by the complement of the arctan of Y/X ((arctan(Y/X)/pi×180)−90) is preferred to be less than−20 degrees and more preferably less than−35 deg and most preferred to be less than−50 deg. Cross section electronmicrographs of the media described here overprinted with phase change ink shows penetration of the ink into these pores and a mechanical interlocking at the points of pore overhang.

The island size is determined as the diameter of a circle having the same surface area as the island. The optimum island size has been determined to have a size of no more than 15 μm. More preferably, the island size is no more than 10 μm. It is most preferred that the island size be at least 1 μm.

Another dimension that describes the surface geometry in the direction perpendicular to the surface is R(z) the average distance between peaks and valleys which is a measure of the unevenness of the surface. This is the average distance between peaks and valleys which is a measure of the unevenness or asperity of the surface. Coated surfaces produced at moderate drying rates, that is when the small islands (less than 10 microns) are prevalent, have asperity (R(z)) values of at least 5.5 μm and no more than 6.2 μm. More preferably the asparity at least 5.5 μm and no more than 6.0 μm. In general, increased solution concentrations will lead to surfaces that are very irregular in size with high R(z) values.

The coating weight is measured gravimetrically. The sample is cut into a 10 cm×10 cm square and weighed on a calibrated analytical balance to the nearest 0.1 mgm. The cut sample is then immersed into acetone, or another suitable solvent, to soften and lift the coating as a free membrane. Any strongly adhered coating is removed with an acetone soaked wipe. The sample is then dried and reweighed to calculate the coating weight in mgm/sqdm by difference.

Tape test density is a quantitative measurement indicating the propensity of the phase change ink to remain adhered to the media under conditions of peel or delamination. The tape test is performed by adhering, using a 10 lb. roller weight, at least 10 cm of 3M Scotch Type 810 Magic Tape (19 mm wide) to cover all of a strip of a 5 cm×5 cm square, maximum black density (Tektronix 016-1307-00 black wax) single layer wax ink crosshatched pattern (with 5 μmm spaced 0.2 mm lines without ink) printed on the media using a Tektronix Phaser 340 in the paper mode at 300×600 dpi, (monochrome) leaving approximately 1 cm of tape unattached. By grasping the unattached tape tag, the tape is pulled off of the media and printed area in one single rapid motion. The density of the peeled (Tp) and the original inked (To) areas on the media are measured using a Macbeth TR927 densitometer zeroed with the clear filter and using the "density" selection, taking care to center the Macbeth spot in a single 5 mm×5 mm crosshatched square. The tape test density is the loss of transmittance according to the following formula:

$$TT = \frac{(100 - \%\,Tp)}{(100 - \%\,To)} \times 100$$

where TT is relative tape test density;

Tp is % transmittance of the area after the tape is peeled off; and

To is % transmittance of the original inked area.

A higher tape test density is preferred since this indicates a smaller percentage of phase change ink removal. No removal of phase change ink would be indicated by a tape test density of 100. Complete removal of the phase change ink would be indicated by a tape test density of 0. Tape test values are typically reproducible to a standard deviation of no larger than 5%.

Impact represents a measure of the adhesion of the phase change ink under conditions of rapid delamination with higher numbers being preferred. Impact is measured by a Gardner Impact Tester (Cat No. 1G1121) from BYK Gardner, Silver Spring, Md. The tester is modified by placing a rubber stopper in the drilled out anvil to a position slightly above being flush with the top of the anvil. This is done so as to avoid gross distortions of the PET base film upon impact by the hammer. The weight used to deliver the hammer blow is the 125 gm weight available from BYK Gardner. A specially modified Tektronix Phaser 340 is used to deliver in one media pass a double layer of black ink uniformly to a 10 cm×19 cm area and after waiting for at least five minutes for the wax layer to come to room temperature, impacts are delivered from a height of 10 cm to each of four spots on a line parallel to the leading edge of the printed sheet on the side opposite the wax. One impact is delivered in the first spot, two in the second in succession, and so on up to a maximum of four impacts in the fourth spot. After impacting, Scotch Magic(TM) Tape (type 810) form 3M Company, St. Paul, Minn. is applied over the impacted spots and slowly removed to lift any dislodged ink. The sample is then rated on a scale of 0 to 4 depending on the number of impacts required to dislodge ink from the impacted area. The following definition of grades were used:

| Grade | Appearance |
|---|---|
| 0 | Significant ink dislodged in one hammer blow with complete removal with two or more blows |
| 1 | No or very little ink removed in one blow, significant ink dislodged in two blows, and complete removal with three or more blows |
| 2 | No or very little ink removed in one or two blows, significant ink dislodged in three blows, and complete removal with four blows |
| 3 | No or very little in removed with one, two or three blows, significant ink dislodged with four blows |
| 4 | No or very little ink removed using up to four consecutive blows |

The judgment of how much ink removal is considered "very little" is made by a comparison to a region which has not been impacted but has had the tape applied and removed.

To remove aging factors from consideration, the tape test densities reported herein are for fresh printings on four week old coatings.

The scratch resistance of coated media is measured by the use of the ANSI PH1.37-1977(R1989) method for determination of the dry scratch resistance of photographic film. The device used is described in the ANSI IT9.14-1992 method for wet scratch resistance. Brass weights up to 900 g. in the continuous loading mode are used to bear on a spherical sapphire stylus of 0.38 mm radius of curvature, allowing an estimated maximum loading of 300 $kgm/cm^2$. Since the stylus is a constant, the results can be reported in gram mass required to break through the coating to the surface of the base polymer. Scratch data is typically accurate to within approximately 50 gms. The reported scratch resistance is for samples measured four weeks after coating.

Total haze of the coated media is measured with a Gardner Hazegard Plus System calibrated to 1, 5, 10, 20 and 30% haze NIST standards (standard deviation 0.02) on 35 mm wide strips held 1.2 cm from the transmission entrance on the flat surface of a quartz cell. The reported haze is for four week old coatings at ambient conditions.

The following examples illustrate the invention and are not intended to limit the scope of the invention.

The major improvement claimed in the present invention is in the retention of ink/media anchorage in impact. Impact is delivered over a short time frame and hence contains frequencies (time transform) which are much higher than those encountered in peel. It is in the damping of these high frequency energies that a high surface area mechanical bond is most effective. The physical disruption of a propagating crack at this interface is a factor. In addition, the rapid dissipation of energy is enhanced by soft materials in contact. This both the mechanical properties and physical structure of the media in contact with the phase change ink is important. The present invention teaches the use of soft, largely organic coatings with many pores possessing inwardly (negatively) sloped walls which anchor mechanically to the phase change ink penetrating into these pores, providing high interfacial area, crack propagation disruption, and a stabilized mechanical lock.

EXAMPLES

Example 1

Preparation of Coating Solutions

The receptive layer solutions were prepared in a jacketed, stirred container at about 11–18 wt % total solids in water. The water soluble polymer, typically available as a powder, was dispersed at moderately high shear in deionized water for a short duration. The shear was decreased, the temperature was raised to above 90° C., and the conditions were maintained until the polymer was completely dissolved (approximately ½ hour). The solution was then cooled to 25–30° C., and the weight percent solids measured. Water insoluble polymer dispersions were added to the solution to the desired weight percent. pH was adjusted to closely approximate that of the inorganic particulate material. Coating aids such as Triton X-100, ethyl alcohol, antimicrobials, bead dispersions and other additives can also be added if desired. A solution containing the inorganic particulate matter was prepared in a separate, stirred container. The polymer solution and inorganic particulate matter solution were then combined and analyzed to insure that pH, viscosity and surface conductivity were suitable for coating. The mixtures were coated within 24 hours of their preparation.

Coating solutions were prepared as described above wherein the water soluble polymer was polyvinylalcohol available as Elvanol 90-50 from E. I. duPont de Nemours, of Wilmington, Del. The water insoluble polymer was a sytrene-acrylate copolymer dispersion wherein the sytrene is in the core and an acrylate shell. The styrene-acrylate copolymer is available under the trade name Glascol RP6, available from Allied Colloids, Inc., 2301 Wilroy Road, Suffolk, Va. 23439. The inorganic particulate matter was silica available as Snowtex-UP from Nissan Chemical Industry, Ltd. of New York, N.Y.

The coating solution was coated using an air knife with variation of the solution analysis, coating speed, and air knife pressure to vary the coating thickness. The films were dried after coating using air impingement providing an air temperature of 85–95° C. which provided a substrate temperature of 25–29 ° C. at the dry point.

The results are recorded in Table 1.

TABLE 1

| Sample | % Soluble | % Insoluble | % P | CW | TT | Imp. | Scr |
|---|---|---|---|---|---|---|---|
| C 1 | 100 | — | 75 | 10 | 78 | 0 | 360 |
| C 2 | 100 | — | 50 | 8 | 67 | 0 | 550 |
| C 3 | — | 100 | 75 | 6 | 83 | 0 | 290 |
| C-4 | 20 | 80 | >75 | <10 | 77 | 0 | 320 |
| C-5 | 12 | 88 | 50 | 45 | 65 | 0 | 440 |
| Inv-1 | 12 | 88 | 20 | 42 | 53 | 0.5 | 410 |
| Inv-2 | 12 | 88 | 3 | 35 | 89 | 1 | 250 |
| Inv-3 | 12 | 88 | 3 | 45 | 91 | 2 | 225 |
| Inv-4 | 12 | 88 | 3 | 65 | 95 | 3 | 195 |
| Inv-5 | 12 | 88 | 3 | 83 | 97 | 4 | 175 |
| Inv-6 | 9 | 91 | 3 | 45 | 81 | 1 | 250 |
| Inv-7 | 17 | 83 | 3 | 45 | 96 | 3 | 210 |

Where:
% Soluble is the percent of the total weight of water soluble polymer and water insoluble polymer represented by the water soluble polymer.
% Insoluble is the percent of the total weight of water soluble polymer and water insoluble polymer represented by the water insoluble polymer.
% P is the percent particulate matter as a function of the combined weight of the water soluble polymer water insoluble polymer and particulate matter.
CW is the coating weight of water soluble polymer, water insoluble polymer, and inorganic particulate matter in mg/dm2.
TT is the percent density remaining after the tape test.
IMP is the result of the impact test.
Scr. is weight required (grams) to initiate and propagate a scratch.

The results illustrate that a high level of inorganic particulate matter (≧50%, by weight) is detrimental to adhesion of ink to the surface as indicated by the impact results (Imp.). Comparing samples C-5 with Inv.-3, Inv.-6 and Inv.-7, for example, illustrates that the adhesion is not merely a function of total coating weight but is a function of the polymer fractions, inorganic particulate level and coating weight.

Example 2

Samples were prepared and coated at a coating weight of 40 mg/$dm^2$ in a manner analogous to that described for Example 1 with 88%, by weight the Glascol RP6 styrene acrylate polymer and 12%, by weight, Elvanol 90-50 polyvinylalcohol. The styrene acrylate copolymer particles size was measured, as received, using a Nikkon light scattering particle size analyzer and determined to have a mean diameter of 69.2 nm at a solution concentration of 5%. The drying rate was varied and the structure was characterized. Structure characterization was accomplished by observing the surface under a 2800× magnification and measuring the average size of the islands reported as the diameter of a circle with the same surface area. Asperity (R(z)) was determined as the average distance from the tops of the islands to the bottom of the valleys, or the average distance traveled from peak to trough as measured with a T. Hubson stylus. The results are recorded in FIG. 2.

TABLE 2

| Sample | DR | IS | R(Z) | Imp. |
|---|---|---|---|---|
| A | 116 | 17.0 | 7.9 | 1 |
| B | 117 | 18.0 | 7.0 | 0.5 |
| C | 170 | 10.0 | 5.5 | 2 |
| D | 212 | 7.0 | 5.5 | 2 |
| E | 280 | 5.0 | 5.6 | 2 |
| F | 276 | 4.5 | 5.3 | 3 |
| G | 374 | 4.5 | 6.1 | 1 |
| H | 706 | 12.0 | 5.6 | 2 |
| I | 1325 | 19.0 | 4.9 | 1 |
| J | 1280 | 24.0 | 4.5 | 0.5 |
| K | 1340 | 21.0 | 6.3 | 0.5 |

TABLE 2-continued

| Sample | DR | IS | R(Z) | Imp. |
| --- | --- | --- | --- | --- |

DR is the drying rate in mg $H_2O$/min.$dm^2$.
IS is the island equivalent diameter in $\mu$m.
R(Z) is the asparity in $\mu$m.
Imp. is as defined previously.

The results of Example 2 illustrate the improvement in impact resistance which can be obtained by optimally drying the media to obtain the proper island size and asparity.

What is claimed is:

1. A recording medium for phase change ink recording comprising:

a support;

more than 30 mg/$dm^2$ and not more than 200 mg/$dm^2$ of a receptive layer coated on said support wherein said receptive layer comprises:

a binder comprising:

a water soluble polymer; and a water insoluble polymer;

wherein the combined weight of said water soluble polymer and said water insoluble polymer comprises at least 50%, by weight, and no more than 95%, by weight, water insoluble polymer;

with the proviso that said receptor layer contains less than 50%, by weight, of an inorganic particulate matter; and said water insoluble polymer comprises styrene and acrylate.

2. The recording medium for phase change ink recording of claim 1 wherein said combined weight of said water soluble polymer and said water insoluble polymer comprises at least 70%, by weight, and no more than 95%, by weight, water insoluble polymer.

3. The recording medium for phase change ink recording of claim 1 wherein said water soluble polymer has a hydrodynamic diameter in water of no more than 0.05 $\mu$m.

4. The recording medium for phase change ink recording of claim 1 wherein said water soluble polymer comprises at least one compound chosen from a group consisting of polyvinyl alcohol, polyacrylamide, methyl cellulose, polyvinyl pyrrolidone and gelatin.

5. The recording medium for phase change ink recording of claim 4 wherein said water soluble polymer is polyvinyl alcohol.

6. The recording medium for phase change ink recording of claim 1 wherein said water soluble polymer comprises at least one element chosen from a group consisting of polyvinyl alcohol, polyacrylamide and polyvinyl pyrrolidone.

7. The recording medium for phase change ink recording of claim 1 wherein said water insoluble polymer has a hydrodynamic diameter in water of at least 0.05 $\mu$m.

8. The recording medium for phase change ink recording of claim 1 wherein said water insoluble polymer is a copolymer comprising 50–99%, by weight, styrene and 1–50%, by weight, acrylate.

9. The recording medium for phase change ink recording of claim 1 wherein said water insoluble polymer is a copolymer comprising a core of styrene and a shell comprising acrylic ester.

10. The recording medium for phase change ink recording of claim 1 wherein said inorganic particulate material represents less than 20%, by weight, of the combined coating weight of said water soluble polymer, said water insoluble polymer and said inorganic particulate material.

11. The recording medium for phase change ink recording of claim 10 wherein said inorganic particulate material represents less than 5%, by weight, of the combined coating weight of said water soluble polymer, said water insoluble polymer and said inorganic particulate material.

12. A recording medium for phase change ink recording comprising:

a polyethylene terephthalate support;

1–200 mg/$dm^2$ of a receptive layer coated on said support wherein said receptive layer comprises:

a binder comprising:

polyvinyl alcohol; and a polymer comprising 90–99%, by weight, styrene and 1–10%, by weight, acrylic ester wherein said polymer comprises styrene in a core and acrylic ester as a shell;

wherein the combined weight of polyvinyl alcohol and said polymer comprises at least 50%, by weight, polymer;

inorganic particulate material wherein said inorganic particulate material is less than 50%, by weight, of the weight of said combined weight of polyvinyl alcohol and said polymer.

13. The recording medium for phase change ink recording of claim 12 wherein said inorganic particulate material represents at least 1%, by weight, and less than 50%, by weight, of the combined coating weight of said polyvinyl alcohol and said polymer.

* * * * *